Nov. 5, 1957  P. S. HOPPER  2,812,036
INLET SCREEN FAIRING
Filed Aug. 7, 1956  2 Sheets-Sheet 1

INVENTOR
PHILIP S. HOPPER
BY Charles A. Warren
ATTORNEY

Nov. 5, 1957   P. S. HOPPER   2,812,036
INLET SCREEN FAIRING
Filed Aug. 7, 1956   2 Sheets-Sheet 2

INVENTOR
PHILIP S. HOPPER
BY Charles A. Warren
ATTORNEY

United States Patent Office 2,812,036
Patented Nov. 5, 1957

2,812,036

INLET SCREEN FAIRING

Philip S. Hopper, Manchester, Conn., assignor to United Aircraft Corporation, East Hartford, Conn., a corporation of Delaware Application August 7, 1956, Serial No. 602,668

6 Claims. (Cl. 183—62)

This invention relates to an inlet screen for a gas turbine power plant, particularly for use in aircraft.

The Newcomb Patent 2,618,358 has a retractable screen assembly which is covered when in retracted position by a sleeve which is axially slidable to provide substantially a smooth outer wall surface for the air inlet to the power plant. When the screen of this patent is operative, however, the outer wall surface of the air inlet leaves a cavity from which the screens are pivoted into operative position. This cavity produces severe wall effects that detrimentally affect the flow of air to the power plant. One feature of the present invention is an arrangement for eliminating this cavity when the screens are operative.

Another feature is an arrangement of radially movable panels that move into alignment with the remainder of the outer wall when the screens are operative. Another feature is a screen arrangement in which the screen is covered when in inoperative position such that a smooth outer wall surface is presented with either the operative or inoperative position of the screen elements.

Other objects and advantages will be apparent from the specification and claims, and from the accompanying drawings which illustrate an embodiment of the invention.

Figure 1:
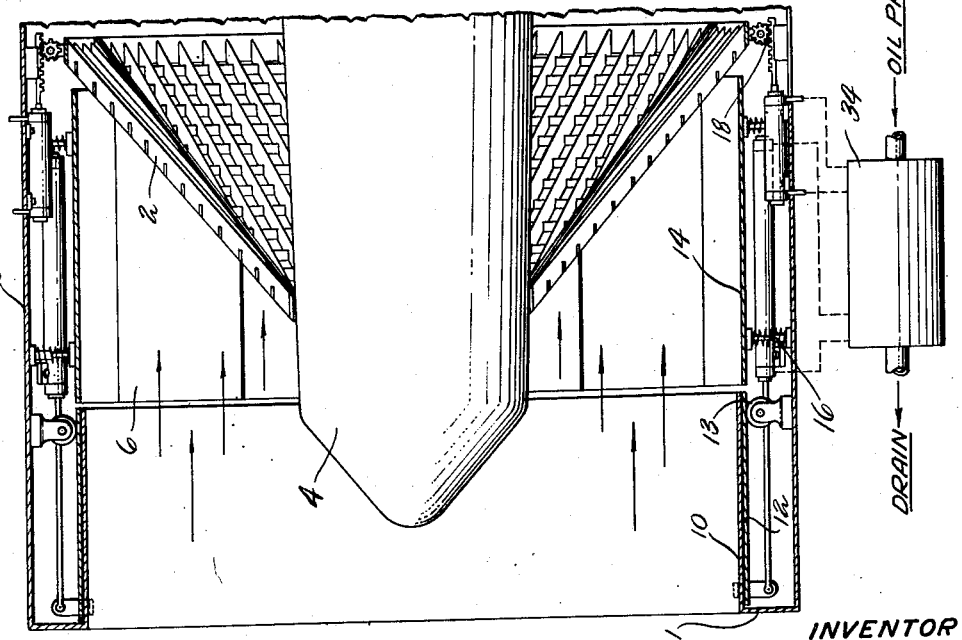
Fig. 1 is a longitudinal sectional view through the inlet section of a power plant showing the screen in operative position.

This invention is shown as applied to the inlet of a gas turbine power plant in which the screen 2, in operative position, extends between the inner cone 4 forming the inner wall of the annular inlet air passage 6 and the cowling or outer cylindrical sleeve 8 which contains the screen segments when inoperative and which encloses the outer wall of the annular air passage. As shown in Fig. 1, the outer wall of the duct is made up in part of a fixed substantially cylindrical sleeve 10 attached to and spaced inwardly from cowling 8, as by an annular plate 11 at the upstream end of both sleeve and cowling. The sleeve 10 extends in a downstream direction from the upstream edge of the cowling. Closely surrounding the sleeve 10 is an axially movable shield in the form of a sleeve or fairing 12, guided as by rollers 13 carried by the cowling, and movable from an inoperative position in radial alignment with sleeve 10 into a position in substantially axial alignment with sleeve 10 to form a downstream extension of this sleeve 10 and thus to constitute a downstream portion of the outer duct wall, as shown in Figs. 2 and 3.

In axial alignment with the sleeve 12 when the screen is operative is a series of sleeve segments 14, each of which is resiliently supported by springs 16 located between the cowling 8 and the sleeve segments and normally urging the segments radially inward into the position of Fig. 1. The segments 14 in the position of Fig. 1 form a part of the outer wall of the air passage being in effect a downstream extension of the sleeve 10 and shield 12.

The screen is made up of a plurality of segments 2a similar to those of the Newcomb patent and each segment is pivoted along its downstream edge on a pin 17 pivoted in a bracket 18 mounted on and extending radially inward of the cowling 8. Each individiual screen segment 2a is moved into and out of operative position as by a pinion 19 on the pin 17 for each segment. This pinion is engaged by a rack 20 on a piston rod 222 projecting from an actuating cylinder 24. The cylinder 24 may be mounted on the cowling 8 and the rack may be guided by a guide block 26 forming part of the bracket 18 on the cowling.

Figure 2:
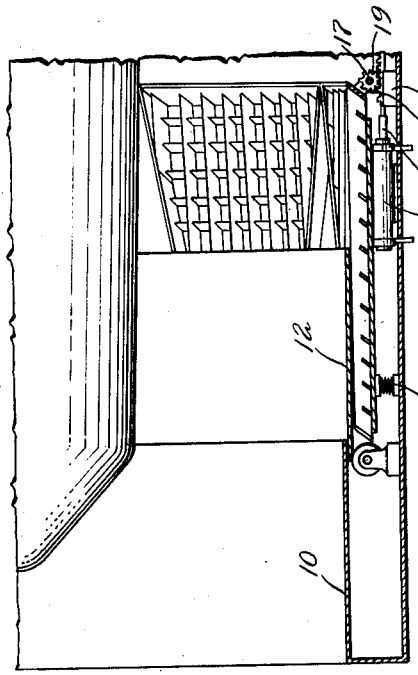
Fig. 2 is a fragmentary sectional view similar to Fig. 1 with the screen retracted.
Figure 3:
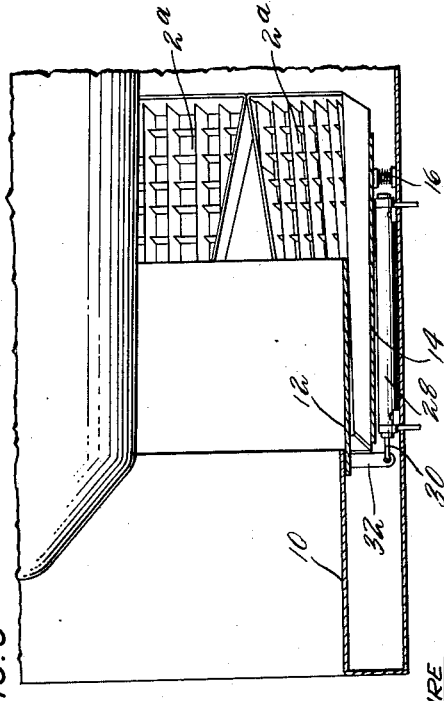
Fig. 3 is a sectional view similar to Fig. 2 but in an angularly spaced plane to show part of the actuating structure.

As the screen segments are moved into the inoperative position of Figs. 2 and 3, the screen segments 2a engage the sleeve segments 14, there being one sleeve segment for each screen segment, and move the sleeve segments outwardly against the springs 16 until the screen segments are located radially outward of the line of movement of sleeve 12. The latter is then moved axially in a downstream direction to overlie the screen segments as shown in Figs. 2 and 3. The sleeve 12 may be moved as, for example, by an actuating cylinder 28 having its projecting piston rod 30 connected to a projecting lug 32 on the sleeve 12. For uniform movement of sleeve 12 a plurality of angularly spaced actuating cylinders, as in Fig. 1, may be used. Although the sleeve 12 is not shown as fully covering the screen segments axially it will be understood that the sleeve 12 may readily be elongated for this purpose if desired.

Figure 4:
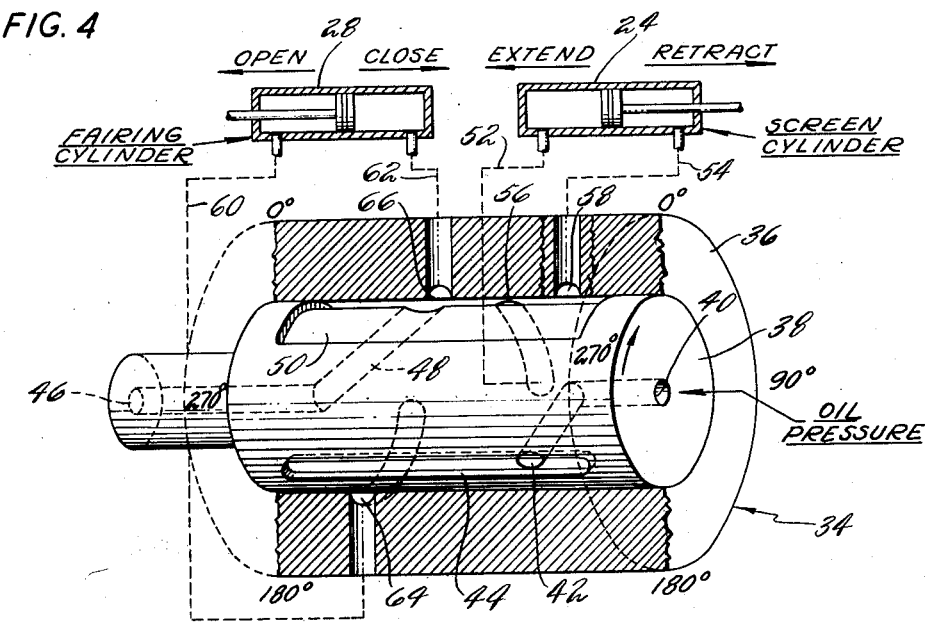
Fig. 4 is a view partly in section of the control valve in Fig. 1.
Figure 5:
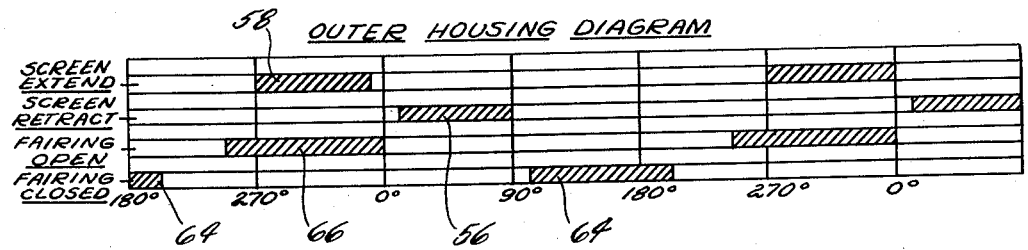
Fig. 5 is a diagrammatic layout of the parts.

The sequential operation of the screen segments and the sleeve 12 may be controlled by a valve 34, as shown in detail in Figs. 4 and 5. As best shown in Fig. 4 the valve includes a casing 36 and a core 38, the latter having a central opening 40 at one end for the admission of oil under pressure with a radial passage 42 to a peripheral groove 44 in the core. The other end of the core has a central passage 46 connected by a radially extending passage 48 to a peripheral groove 50.

The cylinder 24 has its opposite ends connected as by ducts 52 and 54 to grooves 56 and 58 formed in the bore of the casing 36. The cylinder 28 has its opposite ends connected as by ducts 60 and 62 to grooves 64 and 66 in the bore of the casing 36. The extent of the grooves 56 and 58 for the screen cylinder 24 and the grooves 64 and 66 for the cylinder 28 are shown by the diagram of Fig. 5. It will be apparent that as the core 38 of the valve is moved slowly in a clockwise direction, as represented by the arrow in Fig. 4, that the fairing or sleeve 12 will first be moved into the inoperative position of Fig. 1 and that the screen will then be extended into the operative position of Fig. 1. A suitable stop means may be provided for stopping the motion of the valve core after it has been moved through 180° since at this time the screen will have been moved into the operative position of Fig. 1. For retracting the screen, the valve core is moved slowly through the next 180° which will first cause retraction of the screen and then a rearward motion of the sleeve 12 into the position of Figs. 2 and 3.

It is to be understood that the invention is not limited to the specific embodiment herein illustrated and described, but may be used in other ways without departure from its spirit as defined by the following claims.

I claim:

1. In an inlet screen for an annular inlet duct having concentric inner and outer duct walls, said screen including a plurality of screen segments pivoted on axes substantially tangential to the outer duct wall and movable from an operative position across the duct to an inoperative position parallel to and closely adjacent to the outer duct wall, axially movable shield means forming a part of the outer duct wall and axially movable into and out of a position overlying the screen segments when the latter are in inoperative position and segmental plates movable radially into an operative position in axial alignment with said shield means.

2. In an inlet screen for an annular inlet duct having concentric inner and outer duct walls, said screen including a plurality of screen segments pivoted on axes substantially tangential to the outer duct wall and movable from an operative position across the duct to an inoperative position parallel to and closely adjacent to the outer wall, axially movable shield means forming a part of the outer wall and axially movable into and out of a position overlying the screen segments when the latter are in inoperative position and segmental plates movable radially into an operative position in alignment with said shield means, said segmental plates being spring pressed radially inwardly to permit retraction as the screen segments move into inoperative position.

3. In an inlet screen for an annular inlet duct having concentric inner and outer duct walls and a substantially cylindrical cowling surrounding said outer duct wall in spaced relation thereto, said screen including a plurality of screen segments pivotally mounted on said cowling on axes substantially tangential to said outer duct wall and movable from an operative position across the duct to an inoperative position parallel to and closely adjacent to said cowling, segmental plates normally in substantially axial alignment with said outer wall and movable radially outwardly as said screen segments move into inoperative position and an axially movable shield means forming a part of the outer wall and movable into and out of a position to overlie the screen segments when the latter are in inoperative position.

4. In an inlet screen for an annular inlet duct having concentric inner and outer duct walls and a substantially cylindrical cowling surrounding said outer duct wall in spaced relation thereto, said screen including a plurality of screen segments pivotally mounted on said cowling on axes substantially tangential to said outer duct wall and movable from an operative position across the duct to an inoperative position parallel to and closely adjacent to said cowling, axially movable shield means forming a part of the outer duct wall and movable axially from a position overlying the screen segments when the latter are in inoperative position and means for moving said screen segments and said shield means in sequential relation.

5. In an inlet screen for an annular inlet duct having concentric inner and outer duct walls and a substantially cylindrical cowling surrounding said outer duct wall in spaced relation thereto, said outer duct wall including a fixed portion adjacent the forward end of the duct and an axially movable shield portion movable from a position in radial alignment with the fixed portion into a position to form a substantially aligned extension of the fixed wall portion, said screen including a plurality of screen segments mounted on and movable with respect to said cylindrical cowling, said segments being movable from an operative position across the duct to an inoperative position parallel to and closely adjacent to the cowling, said segments in inoperative position lying at a greater distance from the axis of the duct than the outer duct wall and means for moving the movable shield portion of said outer duct wall into a position in radial alignment with said segments.

6. In an inlet screen for an annular inlet duct having concentric inner and outer duct walls and a substantially cylindrical cowling surrounding said outer duct wall in spaced relation thereto, said outer duct wall including a fixed cylindrical portion adjacent the forward end of the duct and an axially movable shield portion movable from a position in radial alignment with the fixed portion into a position to form a substantially axially aligned extension of the fixed wall portion, said screen including a plurality of screen segments mounted on and movable with respect to said cylindrical cowling, said segments being movable from an operative position across the duct to an inoperative position parallel to and closely adjacent to the sleeve, said segments in inoperative position lying at a greater distance from the axis of the duct than the outer duct wall, means for moving the movable shield portion of said outer duct wall into a position in radial alignment with said segments and a plurality of segmental plates, one for each screen segment resiliently held in substantial alignment with the fixed wall portion and movable radially outward therefrom, said plates being in a position to be engaged by the screen segments as they are moved into inoperative position.

References Cited in the file of this patent

UNITED STATES PATENTS

| | | |
|---|---|---|
| 2,407,194 | Vokes | Sept. 3, 1946 |
| 2,618,358 | Newcomb | Nov. 18, 1952 |
| 2,709,499 | Bell et al. | May 31, 1955 |

FOREIGN PATENTS

| | | |
|---|---|---|
| 1,019,937 | France | Nov. 12, 1952 |